United States Patent [19]

Brandvold et al.

[11] Patent Number: 5,371,154

[45] Date of Patent: Dec. 6, 1994

[54] PROCESS FOR FORMING ACID FUNCTIONALIZED ORGANICALLY-BRIDGED POLYSILSESQUIOXANES

[75] Inventors: Timothy A. Brandvold, Buffalo Grove; Jennifer S. Holmgren, Bloomingdale; Thomas P. Malloy, Lake Zurich, all of Ill.

[73] Assignee: UOP, Des Plaines, Ill.

[21] Appl. No.: 149,391

[22] Filed: Nov. 9, 1993

[51] Int. Cl.$^5$ .............................. C08F 283/00
[52] U.S. Cl. ......................... 525/474; 528/25; 528/26; 528/35; 528/43
[58] Field of Search ............ 525/474; 528/35, 43, 528/25, 26

[56] References Cited

U.S. PATENT DOCUMENTS 4,426,508 1/1984 Dromard et al. ................ 528/23

FOREIGN PATENT DOCUMENTS 2669021 5/1992 France .
2669033 5/1992 France .

OTHER PUBLICATIONS

Sohn, Jong Rack; Sam Gon Ryu and Jae Hwal Song. "Preparation of Modified Silica Catalyst with Benzenesulfo Groups". *Journal of Molecular Catalysis*. vol. 62, 1990, L1–L4.
Shea, K. J.; Loy, D. A.; Webster, O. "Aryl–Bridged Polysiulsesquioxanes." *Chemistry of Materials*, 1989, 1, 572–574.
Shea, K. J.; Loy, D. A.; Webster, O. "Arylsilsesquioxane Gels and Related Materials." New Hybrids of Organic and Inorganic Networks. *J. Am. Chem. Soc.* 1992, 114, 6700–6710.
Shea, K. J.; Loy, D. A.; Webster, O. "Aryl–Bridged Polysilsesquioxanes–New Microporous Materials." *Mat. Res. Soc. Symp. Proc.* vol. 180, 1990, pp. 975–980.
Shea, K. J.; Loy, D. A.; and Webster, O. "Aryl–Bridged Polysilsesquioxanes–A New Class of Microporous Materials" *Polymeric Material Sci. Eng.* vol. 63 1990, pp. 281–285.

Primary Examiner—Melvyn I. Marquis
Attorney, Agent, or Firm—Thomas K. McBride; Eugene I. Snyder

[57] ABSTRACT

A process for forming a solid acid catalyst where all of the add functionality is covalently bonded to the organic portion of an organically-bridged polysilsesquioxane framework has been developed. The process involves polymerizing a monomer through sol-gel processing to form an organically-bridged polysilsesquioxane, reacting an acid group onto the organic portion of the organically-bridged polysilsesquioxane, and recovering the acid functionalized product. The invention also includes the product acid functionalized organically-bridged polysilsesquioxane catalyst of the process described. The catalyst is unique in that the acid functionality is incorporated within an organic-inorganic hybrid framework as opposed to being attached to pendant organic groups.

10 Claims, No Drawings

PROCESS FOR FORMING ACID FUNCTIONALIZED ORGANICALLY-BRIDGED POLYSILSESQUIOXANES

BACKGROUND OF THE INVENTION

Acid catalyzed reactions are important reactions in the rearrangement and conversion of hydrocarbons. Such acid catalyzed reactions include isomerization, alkylation, acylation, transalkylation of alkylaromatics, hydration of olefins, dehydration, dehydrohalogenation, oligomerization and polymerization, esterification, hydrolysis, catalytic cracking, catalytic reforming, oxidation, and aldol condensation. Historically, the acid catalysts themselves are often solid acids, and can be of many forms. Solid acids have been disclosed in the form of, e.g., amorphous mixed metal oxides, zeolites, clays, pillared clays, and in the form of functionalized organic polymer gels, and inorganic polymer gels with functionality grafted onto the surface. This invention concerns the last two types of solid acids listed. Solid acids also find use as cation exchange resins, especially where such materials are not strong enough as an acid to function as a catalyst.

An extremely important part of a solid acid is the support to which the functionality is attached. This invention creates a whole new type of solid acids by directly functionalizing an organic-inorganic hybrid whose framework acts as a support for acidic groups. The situation is somewhat analogous to, but a step forward from, organic resins having a polymer backbone to which are attached groups bearing an acid functionality. Organic-inorganic hybrid materials are disclosed in Shea, K. J., and Loy, D. A. *Chemistry of Materials* 1989; Shea K. J., Loy D. A., and Webster O. *J. Am. Chem. Soc.* 1992, 6700–6710 pp.; Shea, K. J., Loy, D. A., Webster, O. *Mater. Res. Soc. Symp. Proc. Vol* 180 *Better Ceram. Chem* 1990, 975–80 pp.; Shea, K. J., Loy, D. A., and Webster O. *Polym. Mater. Sci. Eng. Vol* 63 1990, 281–5 pp. This art teaches that organic groups can be introduced at regular intervals in an inorganic silicate framework, thus forming a three-dimensional organic-inorganic hybrid silicate-like polymeric material, also called an organically-bridged polysilsesquioxane. A two-dimensional representation of the well-known inorganic silicate framework is shown in I, and an analogous representation of the organically-bridged polysilsesquioxane where the ⋮⋮⋮ represents the organic group is shown in II. Of course, the frameworks I and II, in reality, extend to form a three-dimensional, continuous, amorphous solid.

One stated objective of the disclosed work was to provide molecular level control of the morphology of the framework, another was to provide a new chromatographic support, and a third was use in optical applications. However, the current invention furnishes an entirely new twist. By choosing specific types of organic groups to be introduced into the three-dimensional silicate-like framework, and then taking advantage of the reactivity of those organic groups to add acid functionality, this invention presents a whole new type of solid acids which can be used as, for example, catalysts or cation exchange materials.

The present invention solves several problems with solid acids currently in the art. For example, with completely inorganic solid acids, one is limited as to what functionality may be incorporated onto the solid acid. The present invention opens up the choices by allowing a wide variety of acid functionalities to be incorporated due to the reactivity of the organic groups within the framework of the solid acid. Furthermore, the instant invention also provides advantages over completely organic solid acids. The inorganic portion of the present invention affords greater thermal stability, structure stability, and porosity over strictly organic acids. Moreover, the aryl-bridged polysilsesquioxanes provide increased dimensional stability as compared to fully organic acids.

As the above solutions to long standing problems of current acid catalysts suggest, combining the benefits of acid functionality and inorganic polymeric supports is desirable and the prior art shows others have pursued this goal. For example, a relevant published French patent application (2 669 033) discloses an acid catalytic composition comprising a small molecular weight inorganic polymer with sulfonated aryl pendant groups which is grafted onto a completely inorganic support. This acid catalyst is then used in the published French patent application (2 669 021) in a preparation of tertiary olefins. The structure is shown below where M is an inorganic oxide, mixture of inorganic oxides, or an inorganic oxide bearing surface hydroxyl groups, and-/or silylalkoxy groups of formula —Si—$(OR^2)_3$ where each $R^2$ is alkyl; $R^1$ is a divalent group of the formula =Si—$(R^3R^4)$ where $R^3$ is halogen, alkyl, or alkoxy and $R^4$ (which can be the same as or different from $R^3$) is alkyl or alkoxy; p is 0 or 1; Y is an hydroxyl group or bond with inorganic support; $Y^1$ and $Y^2$ are each hydrogen or a group of the formula —$Si(R^7)_3$ where each $R^7$ is alkyl; $A^1$ and $A^2$ are each 6–30 carbon arylsulphonic groups containing 1 or more sulphonic groups or one or more of these substituted by at least one halogen and or at least one 1–5 carbon haloalkyl containing 1 or more halogen atoms and or at least one $NO_2$; n is 5–10,000.

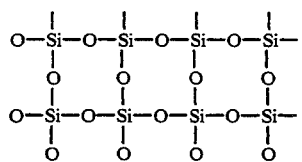

I

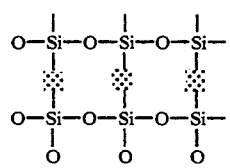

II

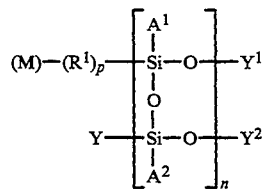

Similarly, as exemplary of work in the art, Shon, J. R., *Journal of Molecular Catalysis* Vol 62, 1990, discloses using esterification and then sulfonation to react pendant "benzenesulfo groups" onto a completely inorganic silica support. Specifically, Shon disclosed the pendant groups

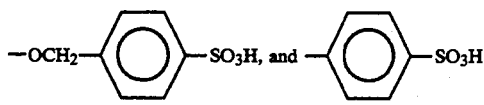

attached to an inorganic silica support. A critical distinction between the prior art and the subject invention is that in the prior art the acid functionality was added to pendant organic groups while in the instant invention the organic groups bearing acid functionality are part of the backbone of the support structure itself, thereby forming an organic-inorganic hybrid polymeric support. See also, U.S. Pat. No. 4,426,508 where an inorganic mineral support is coated with a film of polymeric material comprising pendant sulfonic or phosphonic acid groups.

While Shea et. al. above disclosed the formation of organically-bridged polysilsesquioxanes, and others have attached acid functionalized groups to organic pendant groups pendant to an inorganic polymer, applicants here are the first to recognize and create acid catalysts where the acid functionality is incorporated within an organic-inorganic hybrid silicate-like framework.

SUMMARY OF THE INVENTION

The purpose of this invention is to provide a new type of solid acid catalyst where of the acid functionality is covalently bonded to the organic portion of an organically-bridged polysilsesquioxane framework. More specifically, the invention is a process for forming an acid functionalized organically-bridged polysilsesquioxane by polymerizing a monomer through sol-gel processing to form an organically-bridged polysilsesquioxane, reacting an acid group onto the organic portion of the organically-bridged polysilsesquioxane, and recovering the acid functionalized product. The invention also includes the product acid functionalized organically-bridged polysilsesquioxane of the process described. A specific embodiment of the invention is the process of forming sulfonated phenylene-bridged polysilsesquioxane.

The present invention is further directed to effecting an acid catalyzed reaction wherein a reactant capable of undergoing an acid catalyzed reaction is contacted with an acid functionalized organically-bridged polysilsesquioxane product of the above described process. One embodiment of the invention is effecting the aldol condensation/elimination reaction of acetone with itself to form mesityl oxide by contacting the acetone with an effective amount of sulfonated phenylene-bridged polysilsesquioxane.

DETAILED DESCRIPTION OF THE INVENTION

This invention relates to an organic-inorganic hybrid polymer having an amorphous three-dimensional silicate-type framework where an acid functionality is covalently bonded to the organic portion of the framework. The silicate-type framework is an amorphous organically-bridged polysilsesquioxane, as shown in II above, where the organic bridging group is an aryl group. Silicate-like frameworks of the type employed in this invention have been described in four relevant articles by Shea et. al. cited above. The monomer used to form the silicate-type framework is $Y_3Si-X-SiY_3$, where Y is a halogen or an alkoxy group containing from 1 to 6 carbon atoms, and X is the divalent organic bridging aryl group. The preferred halogen for Y is chloro, and the preferred alkoxy for Y is ethoxy; furthermore, ethoxy is generally preferred over chloro. The specific organic bridging groups disclosed in the prior art are: phenylene, biphenylene, terphenylene, and anthrylene. Additionally, monomers may be prepared from naphthylene and divalent aromatic radicals whose parents are selected from the group consisting of benzophenone, diphenylmethane, diphenylamine and diphenylsulfone. Structures exemplifying such divalent aromatic radicals include:

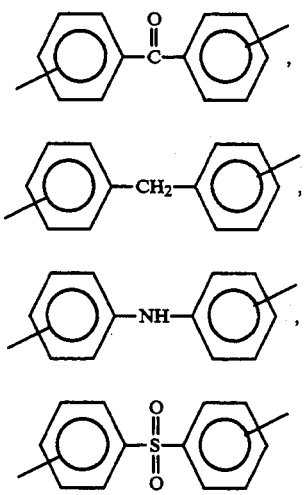

For convenience, monomers where Y is the preferred ethoxy group will be termed ethoxy monomers.

Ethoxy monomers of the phenylene, biphenylene, and naphthylene groups, and the divalent aromatic radicals previously cited, are prepared by Barbier-Grignard reactions from the respective aryl dibromides and a ten fold excess of tetraethoxysilane. In general terms, the Barbier-Grignard reaction is the coupling reaction of two groups which may be inorganic or organic, and for the practice of this invention are carbon containing and silicon containing radicals, under Grignard conditions (magnesium metal, ethereal solvent). The less preferred chloro monomers are prepared by treating the ethoxy monomers with thionyl chloride in the presence of dimethylformamide. Ethoxy monomers of terphenylene and anthrylene are prepared by lithium bromine exchange between 4,4-dibromoterphenyl or 9,10-dibromoanthracene with tert-butyllithium followed by chlorotriethoxysilane at temperatures near $-78°$ C.

The monomers may typically be purified by fractional distillation prior to sol-gel processing. While preferred, purification is not necessary, and processing the unpurified monomers may have economical advantages through minimizing waste. Starting with monomers as described above allows this invention to incorporate the organic bridging groups directly into the polymeric framework as part of the backbone of the framework structure itself, and not simply as pendant groups.

Sol-gel processing is used to polymerize the above monomers to form the inorganic-organic hybrid organically-bridged polysilsesquioxanes Sol-gel processing techniques are well known in the art, and generally consist of: 1) hydrolysis of the monomers to silanols, 2) condensation of the silanols to form siloxanes, first as a sol or colloidal suspension, and thereafter with continued condensation accompanied by extensive branching and cross-linking, to form a gel, i.e., a solid, amorphous, three-dimensional network of siloxane linkages having organically bridged silicons, i.e., polysilsesquioxanes, where the network is supported by a solvent, and 3) removal of the solvent.

The sol-gel processing technique to form the organically-bridged polysilsesquioxane framework of the present invention differs slightly from the standard sol-gel processing technique in the choice of solvents used. Generally, the solvent of choice is water, but in the formation of a hybrid organic-inorganic polymer the solvent must be modified to accommodate differences in monomer solubility. The choice of solvent is not critical as long as the monomer is soluble, and the solvent is at least partly miscible with water. Acceptable solvents include, but are not limited to, alcohols, ethers, and polar aprotic solvents. The following solvents are the most common: ethanol, methanol, isopropyl alcohol, tetrahydrofuran, dimethylformamide, and acetonitrile. Furthermore, various other hydrocarbon solvents in which the monomer is miscible may be used as cosolvents. One example of such a cosolvent is benzene. Which solvent system is preferred depends on the solubility of the subject monomer. In many cases, the preferred solvents are tetrahydrofuran, ethanol, and mixtures thereof.

Once the silanes are solubilized in a suitable solvent, the solution is treated with at least a 3 molar equivalent of water in the presence of an acid or base to catalyze the reaction, and the ethoxysilanes of the monomer are hydrolyzed to silanols which then condense with either other silanols or ethoxysilanes to generate siloxane bonds. The hydrolysis and condensation reactions may require from less than 1 to 48 hours at room temperature. The choice of acid is not critical to the success of the invention and typically a mineral acid is used, the most frequent being aqueous hydrochloric acid at concentrations as low as 0.5 mole-% or as high as 10.8 mole-%. Similarly, when a base is employed the choice is not critical, and the most common base is aqueous ammonia at concentrations as low as 5.0 mole-% to as high as 570 mole-%.

Once the hydrolysis and condensation reactions are complete, and the gene has formed and cured for at least forty-eight hours, the organic based solvent must be removed, Solvent may be removed by supercritical drying, solvent extraction, or simply breaking up the gel and washing with water. Supercritical drying is accomplished by placing the wet gel in an autoclave to dry using $CO_2$ at supercritical conditions of 50° C. and 2000 psig for 6 to 24 hours. When the drying is accomplished under these supercritical conditions, there is no liquid vapor interface to develop strain and the dried gel shows little fracturing. Solvent extraction is a multistep procedure which requires the successive treatment of the wet gel with solvents of decreasing dielectric constant. In the instant invention, if tetrahydrofuran was used in the processing, the tetrahydrofuran could be replaced directly with ether. If ethanol was used in the processing, the ethanol must first be exchanged with tetrahydrofuran, and then the tetrahydrofuran is replaced with ether. To perform the solvent exchange, the gel is placed in a fine fritted glass funnel containing about twice the gel volume of the solvent used in the processing, usually tetrahydrofuran or ethanol. Then the gel is washed with the next solvent in the same manner, continuing until the last solvent passed over the gel is ether. When the degree of fracturing in the gel is not a concern, the wet gel can simply be broken up and washed with water.

The gel is then dried under vacuum for twenty-four hours at room temperature. The gel may now be crushed into particles, usually in the range of 10 to 100 mesh, and redried under vacuum. The product organic-inorganic hybrid polymeric framework yields porosity in the microporous range of 10 to 30 Å as measured by nitrogen adsorption, and surface area of 200 to 1100 $m^2/g$ also measured by nitrogen adsorption. The most commonly encountered surface area is most likely to be in the range of 200 to 700 $m^2/g$, however, lower surface area material is also possible. Generally, the product organically-bridged polysilsesquioxane particle is considered to be a uniform, continuous, three-dimensional polymeric material. The repeating unit of the organically-bridged polysilsesquioxane can best be represented two-dimensionally as:

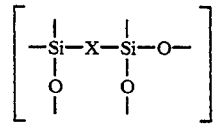

The other necessary component of the invention is the acid functionality covalently bonded to a portion of the organic groups in the supporting silicate-like framework. The acid functionality employed in the practice of this invention can be any of the various acid groups known to the art as effective in catalyzing acid catalyzed reactions, including carboxylic, sulfonic, and phosphonic groups. Generally, the product of our invention contains from 0.01 to 5 milliequivalents of acid functionality per gram of functionalized organically-bridged polysilsesquioxane (meq/g), with the most preferred range being 0.5 to 2 meq/g.

Theoretically, the acid functionality may be either included in the monomer prior to sol-gel processing, or introduced into the organically-bridged gel after sol-gel processing. However, we believe that the technique of including the acid functionality in the monomer prior to sol-gel processing may be problematic since the reactant acids necessary to add acid functionality onto the organic groups may cleave the silicon carbon bonds of the monomer thus destroying the monomer. Therefore, while in theory it may be possible to use, for example, chlorosulfonic acid to introduce a sulfonic group, or phosgene under Freidel-Crafts conditions to introduce a carboxylic group, onto the aryl group, the preferred approach is to covalently bond the acid group to at least some of the organic-bridging groups in the organically-bridged gel after sol-gel processing. Also, the preferred approach may provide economic advantages in preparing bulk quantities of framework material which may be divided into smaller batches with each batch being functionalized differently for different applications.

There are various procedures to functionalize the organically-bridged polysilsesquioxane after sol-gel processing. For example, the gel can be slurried with stirring in a solvent, and a compound containing the desired acid functionality, group added and allowed to react with the organic portion of the organically-bridged polysilsesquioxane, or the unfunctionalized organically-bridged polysilsesquioxane gel can be packed into a reaction chamber or slurried in solution and a gas containing the desired acid functionality passed through the gel or slurry.

Sulfonic acid groups may be covalently introduced onto the organic portion of the organically-bridged polysilsesquioxane by reacting chlorosulfonic acid, sulfur trioxide, or a mixture of sulfur trioxide and sulfuric acid (oleum) with the organic portion. Reaction with chlorosulfonic acid is desirably effected in a suitably unreactive solvent, such as methylene chloride, at temperatures near 0° C. Reaction with the 12 to 33 mass-% sulfur trioxide in sulfuric acid mixture is effected at 60° C. Reaction with sulfur trioxide, which is the preferred approach, requires no solvent and is employed at temperatures near 90° C.

Carboxylic groups may be covalently introduced onto the organic portion of the organically-bridged polysilsesquioxane by, at 25° to 70° C., first reacting the organic portion with aluminum chloride and acetyl chloride to form an acetyl organically-bridged polysilsesquioxane which is then reacted with an oxidizing mixture of bromine, potassium hydroxide and water. Additionally, the preferred approach is to first react the organic portion with a n-butyllithium/tetramethylethylenediamine complex at 60° C. to form a lithiated organically-bridged polysilsesquioxane which is then reacted with carbon dioxide at ambient temperature and acidified to litmus red.

EXAMPLE 1

SULFONATED PHENYLENE-BRIDGED POLYSILSESQUIOXANE BY LIQUID PHASE SULFONATION

The unfunctionalized phenylene-monomer was prepared by the Barbier-Grignard reaction from dibromophenyl and an excess of tetraethoxysilane. Magnesium turnings, 0.30 moles, 0.78 moles of tetraethylorthosilicate, and 150 mL of tetrahydrofuran, freshly distilled from sodium benzophenone ketyl, were combined under nitrogen in a three-necked round bottom flask fitted with a mechanical stirrer, reflux condenser, and addition funnel. Crystal iodine, 10 mg, may be added to the mixture to promote the reaction. 1,4-Dibromobenzene, 0.10 moles, was dissolved in 50 mL of tetrahydrofuran and placed in the addition funnel. The mixture was heated to gentle reflux and the aryl bromide solution was added dropwise over 2.5 hours. When the addition was complete, the mixture was stirred at reflux for an additional 2 hours. The mixture was cooled and filtered to remove unreacted magnesium. The tetrahydrofuran was removed by rotary evaporation. Hexane, 150 mL, was added to the remaining mixture to precipitate the magnesium salts and the mixture was filtered. The hexane was removed by rotary evaporation, and excess tetraethoxysilane was removed by bulb-to-bulb distillation under vacuum, and the remaining oil was distilled under vacuum. The desired product, 1,4-bis(triethoxysilyl)benzene, was collected in 35% yield.

The monomer was polymerized by sol-gel processing to form the phenylene-bridged polysilsesquioxane. Monomer, 30.4 grams, was added to 100 mL of tetrahydrofuran. Separately, 8 mL of 1M hydrochloric acid was mixed with another 100 mL of tetrahydrofuran. The two solutions were combined and mixed for 2 minutes. Another 100 mL of tetrahydrofuran was then added. The hydrolysis and condensation reactions were allowed to proceed for three days at room temperature. The gel was then allowed to cure for another 7 days at room temperature. During the cure time, the gel hardened due to continued crosslinking. After curing, the gel was immersed in 1 L of water. The water was decanted, and the procedure was repeated with another 2 L of water and then 1 L of diethylether. The gel was dried in a vacuum oven for two days at room temperature, and then at 60° C. for another two days. Finally, the gel was crushed to an irregular particle size of about 20 to about 100 mesh and redried under vacuum at about 25° to 60° C. for about 12 hours.

The phenylene-bridged polysilsesquioxane was then functionalized in the liquid phase by introducing sulfonic groups onto the aryl portion of the phenylene-bridged polysilsesquioxane. The phenylene-bridged polysilsesquioxane, 5 grams, and 40 mL of methylene chloride were slurried in a 100-mL three-necked found bottom flask equipped with an addition funnel, reflux condenser, and thermometer. The mixture was stirred under nitrogen atmosphere and chilled to 0° C. in an ice-water-bath. Chlorosulfonic acid, 3.55 grams (30.5 mmol), was dissolved in 10 mL methylene chloride and charged to the addition funnel. The chlorosulfonic acid solution was added to the phenylene-bridged polysilsesquioxane mixture dropwise over 15 minutes. When the addition was complete, the funnel was replaced with a stopper, the ice-water bath was replaced with a heating mantle, and the mixture was heated to reflux for three hours. The reaction mixture was allowed to cool to room temperature, and the sulfonated phenylene-bridged polysilsesquioxane was collected by filtration and washed with five 30 mL portions of water. The sulfonated phenylene-bridged polysilsesquioxane was air dried for 12 hours and then dried under vacuum for an additional 6 hours to afford 0.01 meq/g of acid functionality.

EXAMPLE 2

SULFONATED PHENYLENE-BRIDGED POLYSILSESQUIOXANE BY LIQUID PHASE SULFONATION

The unfunctionalized phenylene-bridged polysilsesquioxane ( 18 grams), which may be prepared as described in Example 1, may be added to 50 mL of 12 to 33 mass-% sulfur trioxide in sulfuric acid (oleum) or to concentrated sulfuric acid. The mixture may be stirred at 60° C. for 2 to 4 hours. The mixture can be then cooled in an ice bath and carefully diluted with 500 mL of water. The sulfonated phenylobridged polysilsesquioxane might then be collected by filtration and washed with water until the washings are neutral, and dried under vacuum.

EXAMPLE 3

SULFONATED PHENYLENE-BRIDGED POLYSILSESQUIOXANE BY GAS PHASE SULFONATION

The unfunctionalized phenylene-bridged polysilsesquioxane (2.5 grams), prepared as described in Example 1, was packed into a 5 cc capacity glass reactor which was placed in a single zone furnace and brought to 90° C. Sulfur trioxide gas was passed through the gel at a rate of 60 cc/min in dry nitrogen for 10 minutes to react on 0.02 meq/g of acid functionality. The apparatus and its contents were allowed to cool to room temperature.

The now sulfonated phenylene-bridged polysilsesquioxane was then discharged from the reactor. Note that since there is no solvent, there is very little waste in the gas phase sulfonation technique.

EXAMPLE 4

CATALYSIS BY SULFONATED PHENYLENE-BRIDGED POLYSILSESQUIOXANE

The sulfonated phenylene-bridged polysilsesquioxane of Example 1 was used as the acid catalyst to effect the aldol condensation/elimination reaction of acetone to make mesityl oxide. It is important to note that the parent unfunctionalized phenylene-bridged polysilsesquioxane did not catalyze the reaction. Acetone was passed upflow over 1 g of the sulfonated polysilsesquioxane in a fixed bed reactor at a flow of 0.2 mL/min, a weight hourly space velocity of 9.5, and a pressure of 500 psig. At 190° C., conversion of acetone was 6% and selectivity to mesityl oxide was 81% as determined by capillary gas chromatography.

EXAMPLE 5

CARBOXYLATED PHENYLENE-BRIDGED POLYSILSESQUIOXANE

The unfunctionalized phenylene-bridged polysilsesquioxane (50 grams), which might be prepared as described in Example 1, may be stirred at 30° to 70° C. with a solution of 15 grams aluminum chloride and 8 grams of acetyl chloride in 100 mL of nitrobenzene for 4 to 20 hours. The resulting acetyl phenylene-bridged polysilsesquioxane may be washed with copious water to remove aluminum salts. A mixture of 100 grams of bromine, 115 grams of potassium hydroxide, 118 mL of water, and 900 mL of dioxane may be prepared at less than 10° C. This oxidizing mixture may then be added to the acetyl phenylene-bridged polysilsesquioxane and may be stirred for 1 to 3 hours at 25° to 70° C. The now functionalized organically-bridged polysilsesquioxane might be isolated by filtration, washed with water, and dried under vacuum.

EXAMPLE 6

CARBOXYLATED PHENYLENE-BRIDGED POLYSILSESQUIOXANE

The unfunctionalized phenylene-bridged polysilsesquioxane (10 grams), which might be prepared as described in Example 1, may be slurried in 65 mL of cyclohexane. One mole equivalent of a 1:1 complex of n-butyllithium/tetramethylethylenediamine may be added to the slurry and the mixture may be stirred under nitrogen at 60° C. for 24 hours. The resulting lithiated phenylene-bridged polysilsesquioxane may be collected by filtration, washed sequentially first with cyclohexane and then with tetrahydrofuran, and might then be re-slurried in tetrahydrofuran at room temperature. Carbon dioxide gas may be bubbled through the slurry for one hour at room temperature. The mixture can be then acidified using hydrochloric acid until the mixture turns litmus paper red. The now functionalized phenylene-bridged polysilsesquioxane may be isolated by filtration, washed with water, and dried under vacuum.

What is claimed is:

1. A process for forming an acid functionalized organically-bridged polysilsesquioxane comprising:

(a) polymerizing a monomer, $Y_3Si—X—SiY_3$, by sol-gel processing to produce an organically-bridged polysilsesquioxane having repeating units of the structure:

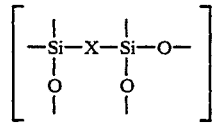

where Y is selected from the group consisting of halogen and alkoxy containing from 1 to 6 carbons atoms, and where the organic portion X is a divalent organic group selected from the group consisting of naphthylene, anthrylene, phenylene, biphenytene, terphenylene, and divalent aromatic radicals whose parents are selected from the group consisting of benzophenone, diphenylmethane, diphenylamine and diphenylsulfone;

b) reacting the organic portion of said organically-bridged polysilsesquioxane with an agent under conditions effective in introducing from about 0.01 to about 5 meq/g of an acid functionality covalently bonded to said organic portion of said polysilsesquioxane, where said agent is selected from the group consisting of chlorosulfonic acid, sulfuric acid, sulfur trioxide, a mixture of sulfuric acid and sulfur trioxide, carbon dioxide, and a mixture of bromine, potassium hydroxide, and water, and the corresponding acid functionality is selected from the group consisting of sulfonic, and carboxylic; and c) recovering the acid functionalized organically-bridged polysilsesquioxane 2. The process of claim 1 where from about 0.5 to about 2 meq/g acid functionality is covalently bonded to the organic portion of said organically-bridged polysilsesquioxane.

3. The process of claim 1 where X is phenylene.

4. The process of claim 1 where said agent is sulfur trioxide, and said acid functionality is sulfonic.

5. The process of claim 1 where said agent is chlorosulfonic acid, and said acid functionality is sulfonic.

6. The product of the process of claim 1.

7. A process for forming a sulfonic acid functionalized organically-bridged polysilsesquioxane comprising:

(a) polymerizing a monomer, $Y_3Si—X—SiY_3$, by sol-gel processing to produce an organically-bridged polysilsesquioxane having repeating units of the structure

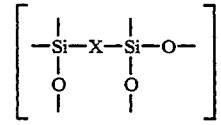

where Y is selected from the group consisting of halogen and alkoxy containing from 1 to 6 carbons atoms, and where the organic portion X is a divalent organic group selected from the group consisting of naphthylene, anthrylene, phenylene, biphenylene, terphenylene, and divalent aromatic radicals whose parents are selected from the group consisting of benzophenone, diphenylmethane, diphenylamine and diphenylsulfone;

b) reacting the organic portion of said organically-bridged polysilsesquioxane with an agent under conditions effective in introducing from about 0.01 to about 5 meq/g of sulfonic acid functionality covalently bonded to said organic portion of said polysilsesquioxane, where said agent is selected from the group consisting of chlorosulfonic acid, sulfuric acid, sulfur trioxide, and a mixture of sulfuric acid and sulfur trioxide; and c) recovering the sulfonic acid functionalized organically-bridged polysilisesquioxane.

8. The process of claim 7 where from about 0.5 to about 2 meq/g sulfonic acid functionality is covalently bonded to the organic portion of said organically-bridged polysilsesquioxane.

9. The process of claim 7 where X is phenylene.

10. A three-dimensional polymer whose repeating unit is

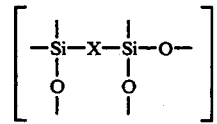

where X is a divalent organic group selected from the group consisting of naphthylene, anthrylene, phenylene, biphenylene, terphenylene, and divalent aromatic radicals whose parents are selected from the group consisting of benzophenone, diphenylmethane, diphenylamine and diphenylsulfone, where at least about 0.2 percent of which is covalently bonded to a sulfuric acid or carboxylic acid group.

* * * * *

UNITED STATES PATENT AND TRADEMARK OFFICE
CERTIFICATE OF CORRECTION

PATENT NO. : 5,371,154
DATED : December 6, 1994
INVENTOR(S) : Timothy A. Brandvold et al It is certified that error appears in the above-indentified patent and that said Letters Patent is hereby corrected as shown below:

In column 10, line 17, change "biphenytene" to --biphenylene --.

Signed and Sealed this

Twenty-fifth Day of April, 1995

Attest:

BRUCE LEHMAN

*Attesting Officer*     *Commissioner of Patents and Trademarks*